Patented Aug. 15, 1933

1,922,230

UNITED STATES PATENT OFFICE 1,922,230

PROCESS OF PREPARING CYANAMID

Nikodem Caro, Berlin-Dahlem, Albert Rudolph Frank, Berlin-Halensee, and Hans-Heinrich Franck, Berlin-Charlottenburg, Germany No Drawing. Application February 7, 1930, Serial No. 426,786, and in Germany February 8, 1929

6 Claims. (Cl. 23—78)

A number of processes have become known to convert calcium carbamate into calcium cyanamid by ammonia and carbon monoxide at 600–800° C. It has further become known that by the glowing of calcium carbamate a residue containing calcium cyanamid is obtained.

The experimental testing of the latter statement showed however, that products with more than 7 to 8% cyanamid nitrogen were not obtained no matter how the conditions of the decomposition of the carbamate were altered, i. e. product which would represent only a calcium cyanamid fertilizer of little value.

The process according to this invention is characterized by the combination of a number of measures which, starting from calcium compounds with ammonia and volatile carbon-oxygen compounds lead to products with a high percentage of calcium cyanamid.

Calcium-carbamate is first produced in any suitable manner, strongly heated at 500° to 600° C. in a vacuum or in a current of nitrogen to form cyanamid, whereupon this product is converted with ammonia and carbon monoxide at 600° to 800° C. into a cyanamid of high percentage with 20 to 35% nitrogen according to the duration of the action and to the gas composition.

The decomposition of the calcium carbamate can be effected directly in the ammonia-carbon monoxide-gas current at increasing temperature, instead of separately heating the calcium carbamate to obtain cyanamid of low percentage and subsequently re-azotising the same with ammonia and carbon monoxide to a product having a high percentage of cyanamid.

In both processes of forming cyanamid waste gases are produced from ammonia and carbonic acid or gas mixtures which contain these gases in the proportion of an ammonia excess. At the condensation of these gases for recuperation it is possible to proceed so that the ammonia-carbonic acid-mixture is condensed as ammonia carbamate and ammonia carbamate liquor, and this ammonia carbamate used as initial material for the conversion of the calcium salts into calcium carbamate.

A circulation process is thus obtained which permits of a specially favourable utilization of the materials employed.

We claim:

1. A process of producing calcium cyanamid consisting in heating calcium carbamate in a first stage to convert it as far as possible into calcium cyanamid, and in treating the reaction product from the first stage with ammonia at 600 to 800° C. to further enrich the same in calcium cyanamid.

2. A process of producing calcium cyanamid consisting in heating calcium carbamate in a first stage to convert it as far as possible into calcium cyanamid, and in treating the reaction product from the first stage with ammonia and carbon oxide at 600 to 800° C. to further enrich the same in calcium cyanamid.

3. A process of producing calcium cyanamid, consisting in heating calcium carbamate in a first stage to convert it as far as possible into calcium cyanamid, and in treating the reaction product from the first stage with ammonia and carbon dioxide at 600 to 800° C. to further enrich the same in calcium cyanamid.

4. A process of producing calcium cyanamid, consisting in heating calcium carbamate in presence of ammonia to convert it as far as possible into calcium cyanamid, and in subsequently treating the reaction product with ammonia at temperatures between 600 and 800° C. to enrich the same in calcium cyanamid.

5. A process of producing calcium cyanamid, consisting in heating calcium carbamate in presence of ammonia and carbon oxide to convert it as far as possible into calcium cyanamid, and in subsequently treating the reaction product with ammonia and carbon oxide at temperatures between 600 and 800° C. to enrich the same in calcium cyanamid.

6. A process of producing calcium cyanamid, consisting in heating calcium carbamate in presence of ammonia and carbon dioxide to convert it as far as possible into calcium cyanamid, and in subsequently treating the reaction product with ammonia and carbon dioxide at temperatures between 600 and 800° C. to enrich the same in calcium cyanamid.

NIKODEM CARO.
ALBERT R. FRANK.
HANS-HEINRICH FRANCK.